(12) United States Patent
Sawahashi

(10) Patent No.: US 8,483,043 B2
(45) Date of Patent: Jul. 9, 2013

(54) APPARATUS FOR GENERATING A SET OF RADIO PARAMETERS, A TRANSMITTER AND A RECEIVER

(75) Inventor: Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/337,613

(22) Filed: Dec. 27, 2011

(65) Prior Publication Data

US 2012/0093257 A1 Apr. 19, 2012

Related U.S. Application Data

(63) Continuation of application No. 11/917,734, filed as application No. PCT/JP2006/311545 on Jun. 8, 2006, now abandoned.

(30) Foreign Application Priority Data

Jun. 14, 2005 (JP) .................................. 2005-174396

(51) Int. Cl.
| | |
|---|---|
| H04J 11/00 | (2006.01) |
| H04J 1/00 | (2006.01) |
| H04W 4/00 | (2009.01) |
| H04B 7/208 | (2006.01) |
| H04L 5/00 | (2006.01) |
| H04W 84/04 | (2009.01) |

(52) U.S. Cl.
CPC ........... H04L 5/0007 (2013.01); H04W 84/042 (2013.01)
USPC ........... 370/208; 370/328; 370/344; 370/480; 375/146; 375/147

(58) Field of Classification Search
USPC .................. 370/208, 328, 344, 480; 375/145, 375/147
See application file for complete search history.

(56) References Cited

U.S. PATENT DOCUMENTS

| | | | |
|---|---|---|---|
| 6,721,569 B1 | 4/2004 | Hashem et al. | |
| 7,023,933 B2 | 4/2006 | Murakami et al. | |
| 7,203,245 B1 * | 4/2007 | Murphy | ........................ 375/260 |
| 7,269,420 B2 | 9/2007 | Heo et al. | |
| 7,738,590 B2 | 6/2010 | Murakami et al. | |

(Continued)

FOREIGN PATENT DOCUMENTS

| | | |
|---|---|---|
| CN | 1350388 | 5/2002 |
| JP | 10-327122 | 12/1998 |

(Continued)

OTHER PUBLICATIONS

Written Opinion issued in PCT/JP2006/3211545 and dated Sep. 12, 2006 (4 pages).
International Search Report issued in PCT/JP2006/311545 and dated Sep. 12, 2006 (9 pages).

(Continued)

Primary Examiner — Paul H Masur
(74) Attorney, Agent, or Firm — Osha • Liang LLP

(57) ABSTRACT

A transmitter includes: a data modulation and channel coding unit configured to perform data modulation and channel coding for a data channel with a modulation level and a channel coding rate updated for each transmission time interval; a multiplexing unit configured to multiplex a control channel and the data channel for each transmission time interval; and an adjusting means configured to adjust a length of the transmission time interval. Increasing a unit of information transmission in the time direction and/or the frequency direction depending on communication conditions can reduce a frequency of inserting (allocating) the control channel, and can improve data transmission efficiency.

2 Claims, 9 Drawing Sheets

U.S. PATENT DOCUMENTS

| | | |
|---|---|---|
| 2003/0147358 A1 | 8/2003 | Hiramatsu et al. |
| 2004/0042492 A1 | 3/2004 | Suzuki et al. |
| 2004/0141457 A1* | 7/2004 | Seo et al. .................. 370/203 |
| 2005/0147186 A1* | 7/2005 | Funamoto et al. ............ 375/324 |
| 2005/0152466 A1 | 7/2005 | Maltsev et al. |
| 2005/0201337 A1 | 9/2005 | Heo et al. |
| 2005/0249120 A1 | 11/2005 | Heo et al. |
| 2008/0077837 A1 | 3/2008 | Lohr et al. |

FOREIGN PATENT DOCUMENTS

| | | |
|---|---|---|
| JP | 2001-103034 | 4/2001 |
| JP | 2001-203665 | 7/2001 |
| JP | 2004-048755 | 2/2004 |
| JP | 2005-117579 A | 4/2005 |

OTHER PUBLICATIONS

Tohru Ohtsu, "Challenge to "Systems Beyond IMT-2000"—Approach in wireless—"; ITU Journal, vol. 33, No. 3, pp. 26-30, Mar. 2003. w/ partial English translation (10 pages).

Office Action of China with Application No. 200680026163.0, dated Sep. 7, 2010, with English translation thereof (10 pages).

Russian Office Action for Application No. 2008100083/09, mailed on Nov. 29, 2010 (6 pages).

Japanese Office Action issued in Japanese Application No. 2005-174396 mailed on Feb. 22, 2011, and partial English translation thereof, 5 pages.

Nobuyuki Miki, "Digital Terrestrial Television Broadcasting," Triceps Co., Ltd., Mar. 5, 2002, pp. 11-15, and partial English translation thereof, 13 pages.

* cited by examiner

■ CONTROL CHANNEL

▦ DATA CHANNEL FOR A CERTAIN USER

☐ OTHER DATA CHANNELS

■ CONTROL CHANNEL

▦ DATA CHANNEL FOR A CERTAIN USER

☐ OTHER DATA CHANNELS

■ CONTROL CHANNEL

▨ DATA CHANNEL FOR A CERTAIN USER

☐ OTHER DATA CHANNELS

■ CONTROL CHANNEL

▨ DATA CHANNEL FOR A CERTAIN USER

☐ OTHER DATA CHANNELS

FIG.9
(A)
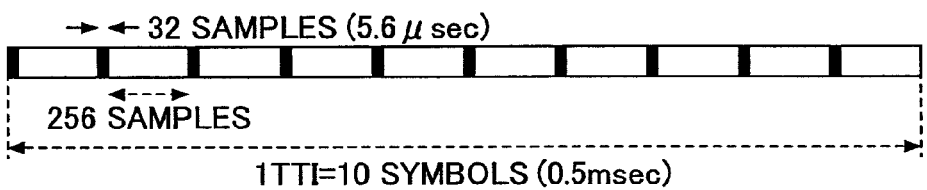
(B)
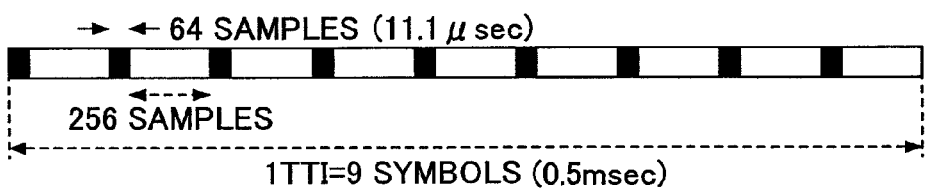
(C)
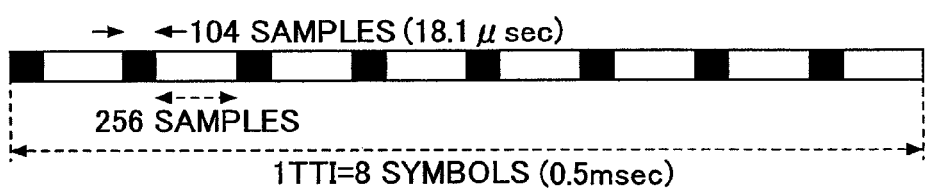
(D)
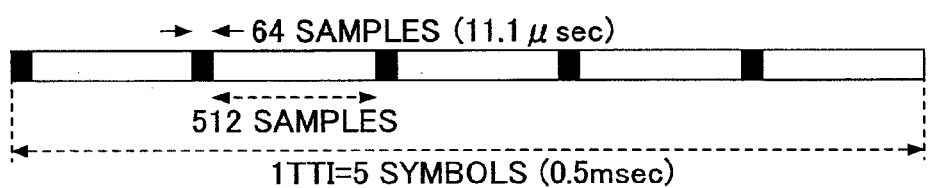
(E)
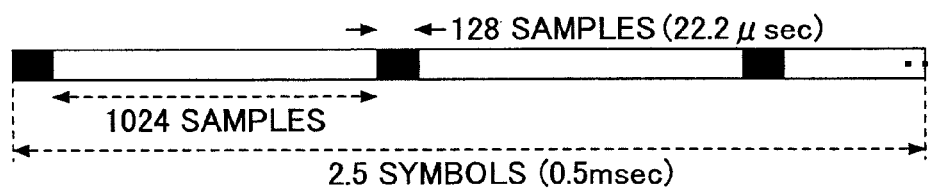
(F)
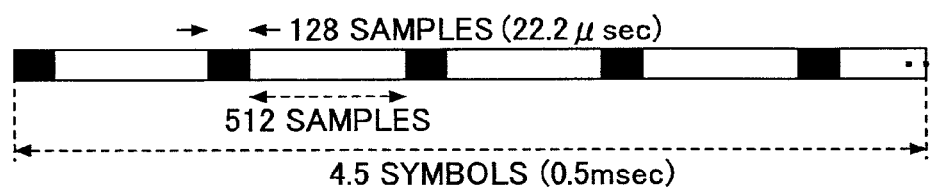

APPARATUS FOR GENERATING A SET OF RADIO PARAMETERS, A TRANSMITTER AND A RECEIVER

CROSS-REFERENCE TO RELATED APPLICATIONS

This application is a continuation application of U.S. patent application Ser. No. 11/917,734 filed May 13, 2009, which is a national stage application of PCT/JP2006/311545 filed Jun. 8, 2006, which claims priority to JP2005/174396 filed Jun. 14, 2005.

BACKGROUND OF THE INVENTION

1. Field of the Invention

The present invention relates to an apparatus for generating a set of radio parameters, a transmitter, and a receiver.

2. Description of the Related Art

In the mobile communication systems where video and/or data are mainly communicated, there is need of a much higher capability than in the conventional mobile communication systems (IMT-2000), and a higher capacity, a faster speed, and a broadband connection have to be achieved. In these systems, it is expected that they will be used under various communication environments such as indoor and outdoor areas. Under the outdoor areas, multiple cells (multi-cell) covering a wide area are provided for enabling fast packet transmission for a fast-moving mobile station. Under the indoor areas, because radio waves are attenuated more drastically, access points are provided within buildings without support of radio communications at outdoor base stations. From other viewpoints such as improved utilization efficiency of communication resources, packet-based communications have been employed even in radio segments rather than conventional circuit switched communications. In communications between a mobile station and an apparatus (upper node) located on the upper layer of a base station, particularly in downlink data transmission, not only a unicast scheme but also a multicast scheme and a broadcast scheme are employed. For example, see Non-Patent Reference 1 for an outlook of future communication systems.

On the other hand, frequency selective fading under multipath environments has significant influence in wideband mobile communication systems. Hence, an OFDM (Orthogonal Frequency Division Multiplexing) system is promising as a next generation communication system. In the OFDM system, a single symbol is generated by attaching a guard interval to an effective symbol including information to be transmitted, and multiple symbols are transmitted during a predetermined transmission time interval (TTI). The guard interval consists of part of information within the effective symbol. The guard interval may be also called a cyclic prefix (CP) or overhead.

A receiver receives data on paths with various propagation delays. According to the OFDM system, if the amount of propagation delay falls within the period of the guard interval, inter-symbol interference can be effectively reduced. Thus, a relatively large guard interval allows delay waves to be advantageously combined. This is advantageous particularly in communications with an extremely large cell radius and in simultaneous transmission of the same information from different cells to a mobile station in accordance with the multicast scheme. However, the guard interval includes only part of the effective symbol, and thus a larger period of the guard interval is not preferable from the viewpoint of information transmission efficiency. In some cases, satisfactory communication quality may be maintained under environments with relatively short propagation delay such as urban areas and indoor areas or environments available for the unicast scheme by setting a relatively short guard interval. Therefore, it is impossible to determine a single type of guard interval optimized under various communication environments. For this reason, it may be possible to provide many sets of radio parameters for defining symbols including guard intervals with various sizes to perform radio communications in the adaptively selected optimal symbol format. However, signal processing corresponding to such various symbol formats leads to an extremely heavy workload, which is unfavorable for mobile stations with a relatively simple configuration. For a mobile station having no option of an operating frequency (clock frequency), available signal processing is strictly limited, and thus the aforementioned problem may have a particularly adverse effect on such a mobile station.

[Non-Patent Reference 1] Ohtsu, "Systems beyond IMT-2000", ITU Journal, Vol. 33, No. 3, pp. 26-30, Mar. 2000

SUMMARY OF THE INVENTION

Problem(s) to be Solved by the Invention

The aforementioned transmission time interval (TTI) controls various parameters for information transmission. For example, parameters such as a unit of packet transmission, a frequency of updating a data modulation scheme and a channel coding rate in the case of MCS (Modulation and Coding Scheme), a unit of error correction coding, a unit of retransmission in the case of ARQ (Automatic Repeat reQuest), and a unit of packet scheduling are determined by the TTI. Because a control channel, which includes control information such as MCS information, retransmission information, and scheduling information, is used for demodulating a data channel, the control channel has to be used along with the data channel during each TTI. On the other hand, a user can transmit information during one or more TTIs, depending on the contents of information to be transmitted. Accordingly, when multiple TTIs are used for data transmission, control channels for the respective TTIs are multiplexed for transmission. However, when the same user transmits data continuously (see FIG. 1), the control channel may not be always necessary for each TTI, because it is not necessary to change radio parameters for each TTI. The situation where the control channel is used for transmission during each TTI is not preferable from the viewpoint of data transmission efficiency.

An OFDM mobile communication system is under discussion, where a wide frequency band is divided into multiple frequency blocks and a unit of information transmission in the frequency direction is defined by the frequency block. The frequency block is also referred to as a chunk (or a resource block), and a single frequency block includes one or more subcarriers. A user can transmit information with one or more frequency blocks. When multiple frequency blocks are used for data transmission, multiple control channels for the respective frequency blocks are multiplexed for transmission, because the data channel is used for transmission for each frequency block. These control channels may include information about frequency block allocation in addition to the aforementioned MCS information and so on. Again, when the same user transmits data with multiple frequency blocks (see FIG. 2), the control channel may not be always necessary for each frequency block. The situation where the control channel is used for transmission for each frequency block is not preferable from the viewpoint of data transmission efficiency.

The present invention addresses at least one of the aforementioned problems. It is a general object of the present invention to provide a transmitter, a receiver, and an apparatus for generating a radio parameter, which can improve information transmission efficiency in an OFDM mobile transmission system.

Means for Solving the Problem

According to one aspect of the present invention, there is provided an OFDM transmitter, which includes:
a data modulation and channel coding unit configured to perform data modulation and channel coding for a data channel with a modulation level and a channel coding rate updated for each transmission time interval;
a multiplexing unit configured to multiplex a control channel and the data channel for each transmission time interval; and
an adjusting means configured to adjust a length of the transmission time interval.

Effect of the Invention

According to an embodiment of the present invention, it is possible to improve information transmission efficiency in an OFDM mobile communication system.

BRIEF DESCRIPTION OF THE DRAWINGS

FIG. 9 shows symbol formats respectively defined by sets of symbol parameters derived in accordance with one embodiment of the present invention.

DESCRIPTION OF THE PREFERRED EMBODIMENTS

Figure 1:
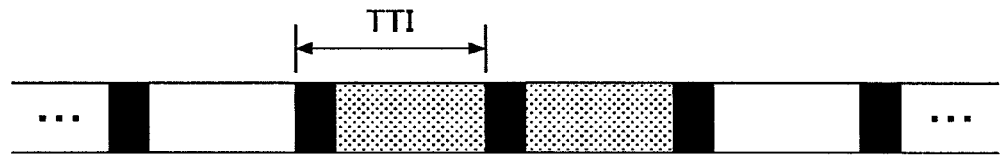
FIG. 1 shows a case where control channels and data channels are used for transmission.
Figure 2:
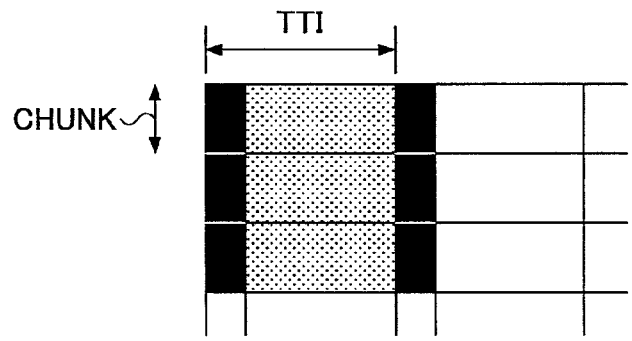
FIG. 2 shows a case where control channels and data channels are used for transmission.

Description of Notations 302-1 to 302-$N_D$: data channel processing unit
304: control channel processing unit
306: multiplexing unit
308: Inverse Fast Fourier Transform unit
310: guard interval insertion unit
312: digital to analog (D/A) conversion unit
320: symbol parameter adjusting unit
321: TTI adjusting unit
322: turbo coder
324: data modulator
326: interleaver
328: serial to parallel (S/P) conversion unit
342: convolution coder
344: QPSK modulator
346: interleaver
348: serial to parallel (S/P) conversion unit
402: orthogonal modulator
404: local oscillator
406: bandpass filter
408: mixer
410: local oscillator
412: bandpass filter
414: power amplifier
502: antenna
504: low noise amplifier
506: mixer
508: local oscillator
510: bandpass filter
512: automatic gain control unit
514: orthogonal detector
516: local oscillator
518: analog to digital conversion unit
520: symbol timing detection unit
522: guard interval removal unit
524: Fast Fourier Transform unit
526: demultiplexer
528: channel estimation unit
530: channel compensation unit
532: parallel to serial (P/S) conversion unit
534: channel compensation unit
536: deinterleaver
538: turbo decoder
540: Viterbi decoder
542: symbol parameter adjusting unit
544: TTI adjusting unit

BEST MODE OF CARRYING OUT THE INVENTION

According to one aspect of the present invention, a transmission time interval (TTI) is adjusted depending on communication conditions. A control channel is multiplexed with a data channel for each TTI. The control channel may be multiplexed into part of subcarriers. Increasing a unit of information transmission in the time direction and/or the frequency direction depending on communication conditions can reduce a frequency of inserting (allocating) the control channel, and can improve data transmission efficiency.

The control channel may include information about a modulation level and a channel coding rate. The transmitter may store two or more sets of parameters, each of which defines a symbol including a guard interval with a different period and an effective symbol with the same period. The transmitter can determine a symbol format depending on communication conditions without delay.

According to one aspect of the present invention, there is provided an apparatus for generating a set of radio parameters used for an OFDM mobile communication system which transmits and receives multiple symbols for each transmission time interval, each of the multiple symbols including a guard interval and an effective symbol. The apparatus includes a first deriving unit configured to derive a second set of symbol parameters, so that a period of an effective symbol defined by a first set of symbol parameters is equal to a period of an effective symbol defined by the second set of symbol parameters, and a period of a guard interval defined by the first set of symbol parameters is different from a period of a guard interval defined by the second set of symbol parameters. The apparatus also includes a second deriving unit configured to derive a third set of symbol parameters, so that a share of a guard interval in a symbol defined by the first set of symbol parameters is equal to a share of a guard interval in a symbol defined by the third set of symbol parameters, and a length of the symbol defined by the first set of symbol parameters is different from a length of the symbol defined by the third set of symbol parameters. A length of the transmission time interval, a length of the symbol, or both a length of the transmission time interval and a length of the symbol is adjusted so that an integral number of symbols are transmitted during a single transmission time interval. The apparatus can effectively derive a set of radio parameters which has a desired number of subcarriers to be used, a desired loss rate (a share of a guard interval in a symbol), and a desired number of symbols within one or more TTIs. For example, assuming that periods of effective symbols are mutually equal (i.e. subcarrier intervals are mutually equal), any radio communication device can always use the same signal processing for OFDM modulation and demodulation (Inverse Fast Fourier Transform and Fast Fourier Transform) even if any set of symbol parameters is used. Also assuming that the loss rate is kept constant, data transmission efficiency can be also kept constant even if any set of symbol parameters is used.

According to one aspect of the present invention, a set of symbol parameters is derived so that the subcarrier interval and the loss rate have desired values. For example, the number of subcarriers defined by a certain set of symbol parameters may be determined to be an integral multiple of the number of subcarriers defined by another set of symbol parameters. As a result, a set of symbol parameters with a significantly different period of the guard interval can be derived while controlling the subcarrier interval and the loss rate. When a non-integral number of symbols, which are derived while controlling the loss rate, are included in a single transmission time interval, the number of symbols for each transmission time interval can be adjusted to be an integer by extending the transmission time interval. Such an adjustment is preferable from the viewpoint of simplified signal processing.

First Embodiment

Although a system employing OFDM (Orthogonal Frequency Division Multiplexing) for downlink communications is described in the following embodiment, the present invention is also applicable to other multi-carrier systems.

Figure 3:
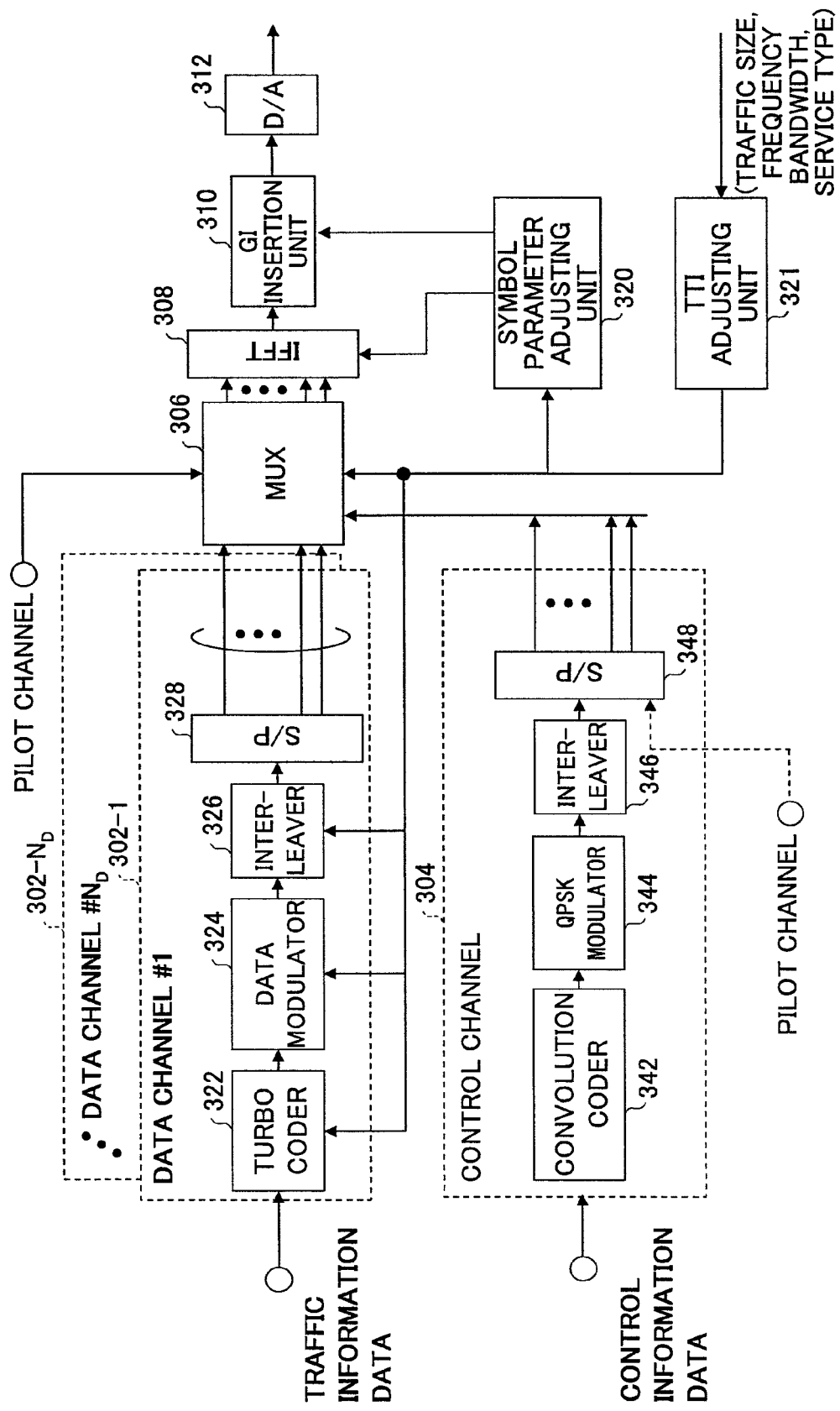
FIG. 3 shows a (first) block diagram for illustrating a transmitter in accordance with one embodiment of the present invention.

FIG. 3 shows a (first) block diagram for illustrating a transmitter in accordance with one embodiment of the present invention. Although this transmitter is typically included in a base station, the same transmitter may be also included in a mobile station. A base station includes $N_D$ data channel processing units 302-1 to 302-$N_D$, a control channel processing unit 304, a multiplexing unit (MUX) 306, an Inverse Fast Fourier Transform (IFFT) unit 308, a guard interval insertion unit 310, a digital to analog (D/A) conversion unit 312, a symbol parameter adjusting unit 320, and a TTI adjusting unit 321. The $N_D$ data channel processing units 302-1 to 302-$N_D$ mutually have the same configuration and function, and the data channel processing unit 302-1 is representatively described hereinafter. The data channel processing unit 302-1 includes a turbo coder 322, a data modulator 324, an interleaver 326, and a serial to parallel (S/P) conversion unit 328. The control channel processing unit 304 includes a convolution coder 342, a QPSK modulator 344, an interleaver 346, and a serial to parallel (S/P) conversion unit 348.

The $N_D$ data channel processing units 302-1 to 302-$N_D$ perform baseband processing for transmitting traffic information data in the OFDM system. The turbo coder 322 performs encoding for enhancing error tolerance of the traffic information data. The data modulator 324 modulates the traffic information data in accordance with a proper modulation scheme such as QPSK, 16 QAM and 64 QAM. In the case of adaptive modulation and coding (AMC), this modulation scheme is modified if needed. The interleaver 326 sorts the traffic information data in accordance with a predetermined pattern. The serial to parallel (S/P) conversion unit 328 converts a serial signal sequence (stream) into parallel signal sequences. The number of parallel signal sequences may be determined based on the number of subcarriers. The data channel processing units 302-1 to 302-$N_D$ perform the aforementioned operations for each transmission time interval supplied by the TTI adjusting unit 321.

The control channel processing unit 304 performs baseband processing for transmitting control information data in OFDM system. The convolution coder 342 performs encoding for enhancing error tolerance of the control information data. The QPSK modulator 344 modulates the control information data in accordance with the QPSK modulation scheme. Any other proper modulation scheme may be employed, however, the QPSK modulation scheme with a lower number of modulation levels is employed in this embodiment due to the lesser amount of control information data. The interleaver 346 sorts the control information data in accordance with a predetermined pattern. The serial to parallel (S/P) conversion unit 348 converts a serial signal sequence into parallel signal sequences. The number of parallel signal sequences may be determined based on the number of subcarriers.

The multiplexing unit (MUX) 306 multiplexes the processed (modulated, encoded, etc.) traffic information data and the processed control information data. In this embodiment, a pilot channel (reference signal) may be input into the multiplexing unit 306 and multiplexed. In other embodiments, a pilot channel may be input into the serial to parallel conversion unit 348 and multiplexed in the frequency direction, as shown by the dotted line in FIG. 3. The multiplexing may be any scheme of time multiplexing, frequency multiplexing, or both time and frequency multiplexing.

The Inverse Fast Fourier Transform unit 308 performs Inverse Fast Fourier Transform for an input signal, and then performs OFDM modulation.

The guard interval insertion unit 310 generates a symbol in compliance with the OFDM system by adding a guard interval to the modulated signal. As is well-known, the guard interval is generated by duplicating part of the head or tail of the symbol to be transmitted.

The digital to analog (D/A) conversion unit 312 converts a baseband digital signal into an analog signal.

The symbol parameter adjusting unit 320 adjusts symbol parameters for use in communications. The symbol parameters (set of symbol parameters) include some information for defining the format of the OFDM symbols, and include a set of information items for defining values such as the period $T_{GI}$ of the guard interval, the period of the effective symbol, the share of the guard interval in a single symbol, and the subcarrier interval $\Delta f$. It should be noted that the period of the effective symbol is equal to the reciprocal of the subcarrier interval $1/\Delta f$. The symbol parameter adjusting unit 320 determines a proper set of symbol parameters depending on communication conditions or instructions from other devices. For example, the symbol parameter adjusting unit 320 may selectively use a different set of symbol parameters based on whether communications are carried out in accordance with the multicast scheme. For example, a set of symbol parameters for defining the guard interval with a shorter period may be employed in the unicast scheme, whereas a set of symbol parameters for defining the guard interval with a longer period may be employed in the multicast scheme. The symbol parameter adjusting unit 320 may compute and derive a proper set of symbol parameters on a case-by-case basis. Alternatively, the symbol parameter adjusting unit 320 may store multiple sets of symbol parameters in a memory in advance and may select one of the sets of symbol parameters if needed. The manner of deriving the set of symbol parameters will be described below.

The TTI adjusting unit 321 determines the length of the transmission time interval (TTI), and supplies the determined length of the transmission time interval to each data channel processing unit 302-1 to 302-$N_D$, the multiplexing unit 306, and the symbol parameter adjusting unit 320. The length of the TTI may be determined based on information determined by an application such as a traffic size, information about the base station such as a frequency bandwidth, and/or information about a service type such as multicasting, unicasting, and broadcasting. The transmitter may notify the receiver of the determined length of the transmission time interval by means of some control signals. For example, the length of the transmission time interval may be determined when a call is connected.

Figure 4:
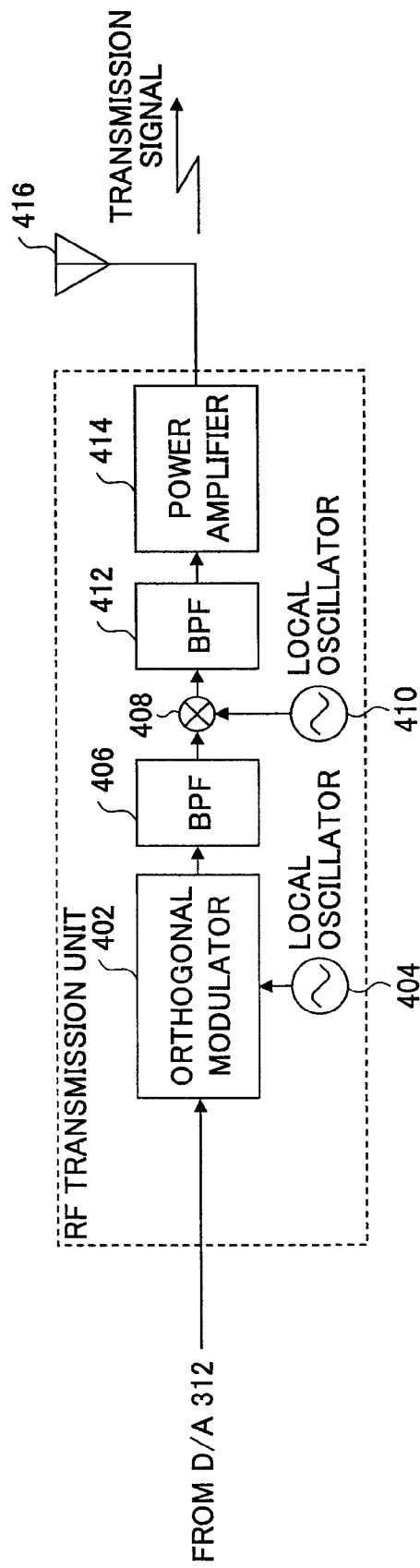
FIG. 4 shows a (second) block diagram for illustrating a transmitter in accordance with one embodiment of the present invention.

FIG. 4 shows a (second) block diagram for illustrating a transmitter in accordance with one embodiment of the present invention. In FIG. 4, the portion (RF transmission unit) subsequent to the digital to analog conversion unit 312 in FIG. 3 is shown. The RF transmission unit includes an orthogonal modulator 402, a local oscillator 404, a bandpass filter 406, a mixer 408, a local oscillator 410, a bandpass filter 412, and a power amplifier 414.

The orthogonal modulator 402 generates an in-phase component (I) and a quadrature component (Q) of an intermediate frequency from an input signal. The bandpass filter 406 removes a frequency component unnecessary for the intermediate frequency band. The mixer 408 uses the local oscillator 410 to convert (up-convert) the intermediate frequency signal into a high frequency signal. The bandpass filter 412 removes an unnecessary frequency component. The power amplifier 414 amplifies signal power for radio transmission from an antenna 416.

Traffic information data input into the data channel processing unit in FIG. 3 is encoded by the turbo coder 322, is modulated by the data modulation unit 324, is sorted by the interleaver 326, and is made parallel by the serial to parallel converter 328. Similarly, control information data is encoded, modulated, interleaved, and made parallel. Data channels and control channels are multiplexed for each subcarrier and for each transmission time interval by the multiplexing unit 306, and are OFDM modulated by the Inverse Fast Fourier Transform unit 308. Then, a guard interval is added to the modulated signal for outputting baseband OFDM symbols. The baseband signal is converted into an analog signal. Then, the converted signal is orthogonally modulated by the orthogonal modulator 402 in the RF processing unit in FIG. 4. After band-limiting, the modulated signal is properly amplified and transmitted.

Figure 5:
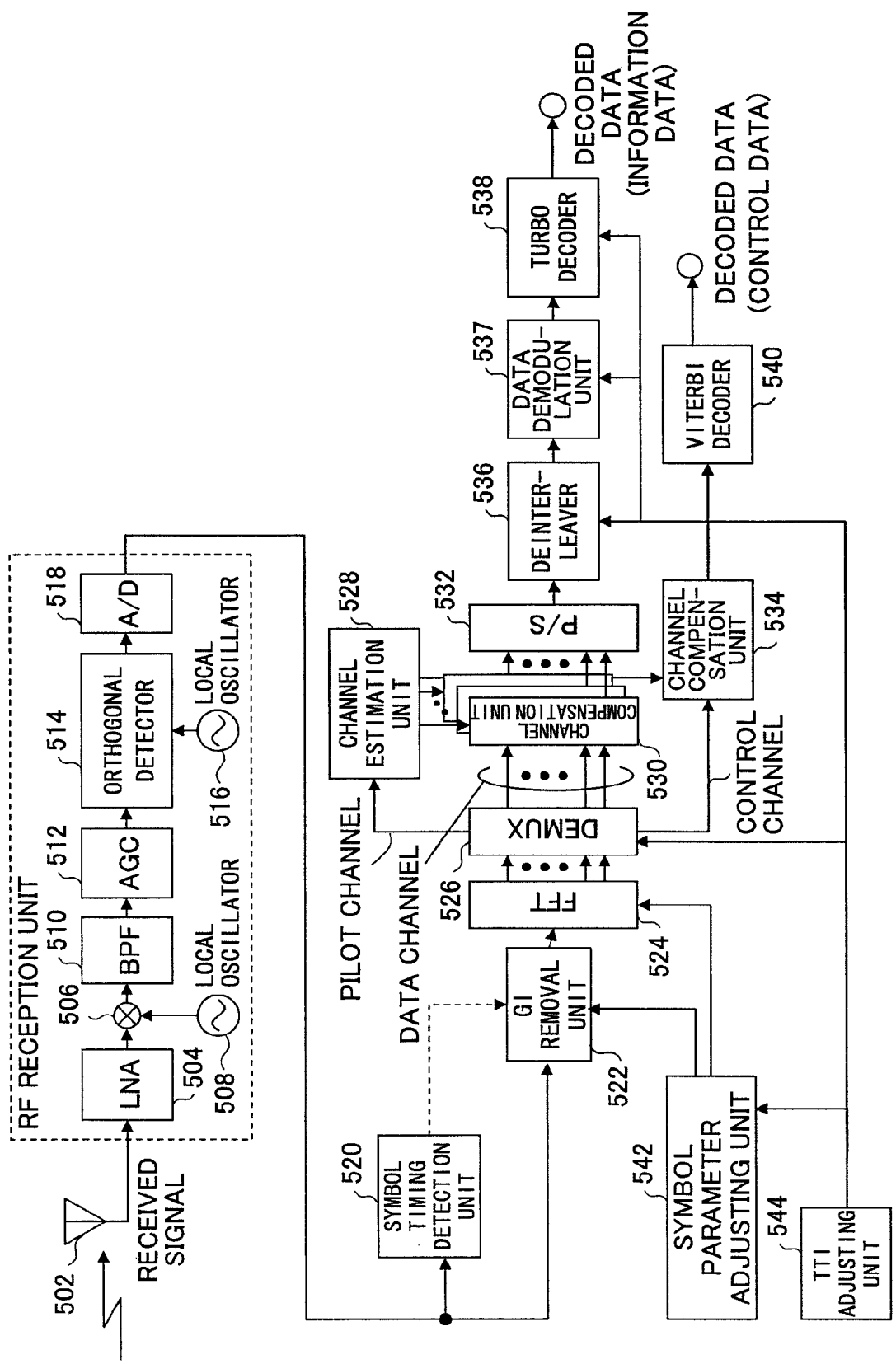
FIG. 5 shows a block diagram for illustrating a receiver in accordance with one embodiment of the present invention.

FIG. 5 shows a block diagram for illustrating a receiver in accordance with one embodiment of the present invention.

Although this receiver is typically included in a mobile station, it may be also included in a base station. The receiver includes an antenna 502, a low noise amplifier 504, a mixer 506, a local oscillator 508, a bandpass filter 510, an automatic gain control unit 512, an orthogonal detector 514, a local oscillator 516, an analog to digital conversion unit 518, a symbol timing detection unit 520, a guard interval removal unit 522, a Fast Fourier Transform unit 524, a demultiplexer 526, a channel estimation unit 528, a channel compensation unit 530, a parallel to serial (P/S) conversion unit 532, a channel compensation unit 534, a deinterleaver 536, a data demodulation unit 537, a turbo decoder 538, a Viterbi decoder 540, a symbol parameter adjusting unit 542, and a TTI adjusting unit 544.

The low noise amplifier 504 properly amplifies a signal received via the antenna 502. The amplified signal is converted (down-converted) into an intermediate frequency by the mixer 506 and the local oscillator 508. The bandpass filter 510 removes an unnecessary frequency component. The automatic gain control unit 512 controls the gain of the amplifier so as to properly maintain the signal level. The orthogonal detector 514 uses the local oscillator 516 to perform orthogonal demodulation based on an in-phase component (I) and a quadrature component (Q) of the received signal. The analog to digital conversion unit 518 converts an analog signal into a digital signal.

The symbol timing detection unit 520 detects timing of symbols (symbol boundary) based on the digital signal.

The guard interval removal unit 522 removes a portion corresponding to the guard interval from the received signal.

The Fast Fourier Transform unit 524 performs Fast Fourier Transform for an input signal, and then performs OFDM demodulation.

The demultiplexer 526 extracts pilot channels, control channels, and data channels multiplexed into a received signal. This extraction is performed corresponding to multiplexing at the transmitter (operations in the multiplexing unit 306 in FIG. 3).

The channel estimation unit 528 uses the pilot channels to estimate conditions of the propagation path, and outputs a control signal for adjusting the amplitude and phase to compensate for the channel fluctuations. This control signal is output for each subcarrier.

The channel compensation unit 530 adjusts the amplitude and phase of the data channels for each subcarrier based on information input from the channel estimation unit 528.

The parallel to serial (P/S) conversion unit 532 converts parallel signal sequences into a serial signal sequence.

The channel compensation unit 534 adjusts the amplitude and phase of the control channels for each subcarrier based on information input from the channel estimation unit 528.

The deinterleaver 536 sorts signals in accordance with a predetermined pattern. The predetermined pattern corresponds to the inverse pattern for sorting in the interleaver (326 in FIG. 3) in the transmitter.

The data demodulation unit 537 performs demodulation for the received signal for each transmission time interval, corresponding to the modulation scheme in the transmitter.

The turbo coder 538 and the Viterbi decoder 540 decode traffic information data and control information data, respectively.

The symbol parameter adjusting unit 542 determines symbol parameters for use in communications as is the case with the symbol parameter adjusting unit 320 in FIG. 3. The symbol parameter adjusting unit 542 may compute and derive a proper set of symbol parameters on a case-by-case basis. Alternatively, the symbol parameter adjusting unit 542 may store multiple sets of symbol parameters in a memory in advance and access them if needed. The manner of deriving the set of symbol parameters will be described below.

The TTI adjusting unit 544 determines the length of the transmission time interval, and supplies the determined length of the transmission time interval to the demultiplexer 526, the deinterleaver 536, the data demodulation unit 537, the turbo decoder 538, and the symbolparameter adjusting unit 542. The transmitter may notify the receiver of the determined length of the transmission time interval by means of some control signals. For example, the length of the transmission time interval may be determined when a call is connected.

A signal received via an antenna is converted into a digital signal after amplification, frequency conversion, band-limiting, and orthogonal demodulation in the RF reception unit. The Fast Fourier Transform unit 524 performs an OFDM demodulation for a signal without a guard interval. The demodulated signal is demultiplexed into pilot channels, control channels, and data channels in the demultiplexer 526. The pilot channels are input to the channel estimation unit 528, and a compensation signal for compensating for channel fluctuations is output from the channel estimation unit 528 for each subcarrier. The data channels are compensated for by means of the compensation signal for each subcarrier and are converted into a serial signal. The converted signal is sorted by the deinterleaver 526 in accordance with the inverse pattern for sorting in the interleaver and is decoded in the turbo decoder 538. Similarly, the control channels are also compensated for by means of the compensation signal and are decoded in the Viterbi decoder 540. Afterward, signal processing is carried out with use of the decoded data and control channels.

Figure 6:
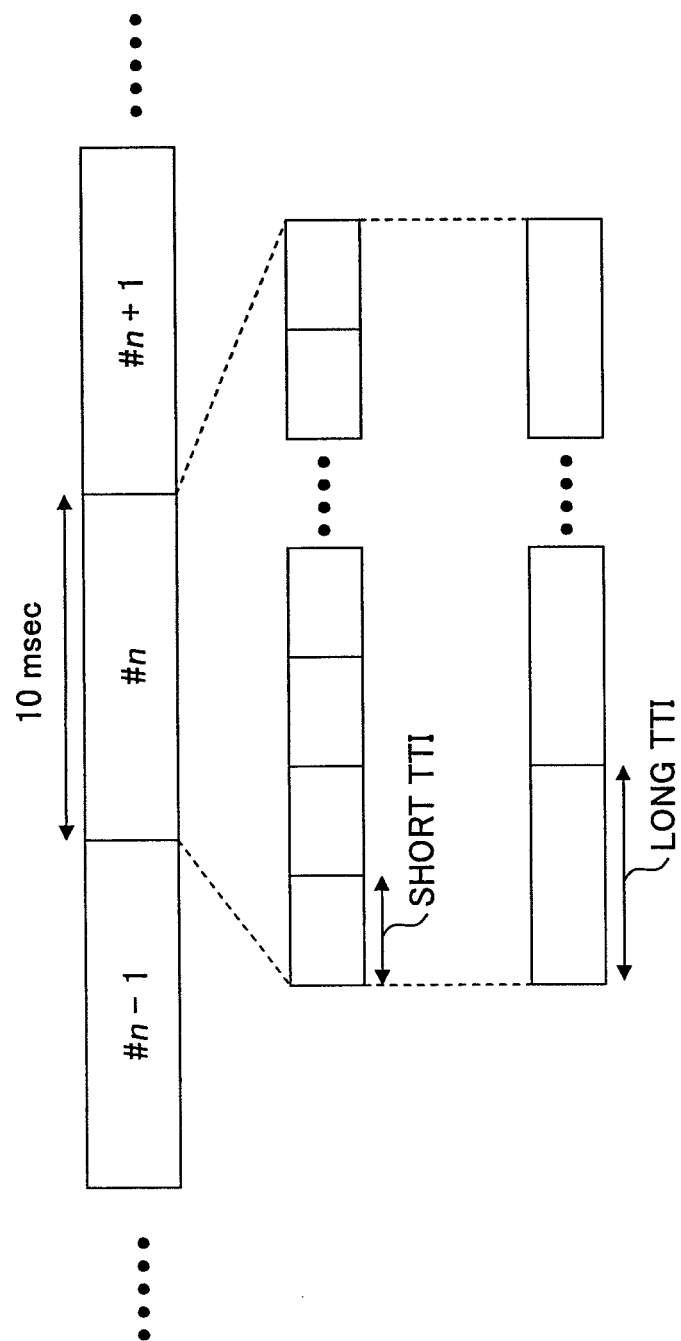
FIG. 6 shows a relationship between two types of TTI (a long TTI and a short TTI) and a frame.

FIG. 6 shows data transmission in accordance with the present embodiment. In this embodiment, the transmission time interval (TTI) is not fixed, but two types of TTI (a long TTI and a short TTI) can be used depending on communication conditions. It should be noted that the length of the frame is kept constant in order to meet the requirement for ensuring backward compatibility with existing communication systems. In the shown example, the long transmission time interval is twice longer than the short transmission time interval. For example, the length of the frame is equal to 10 ms, the length of the short TTI is equal to 0.5 ms, and the length of the long TTI is equal to 1.0 ms. In the case of the short TTI, a single frame includes 20 TTIs, whereas in the case of the long TTI, a single frame includes only 10 TTIs. Although two types of TTI are provided in FIG. 6 for ease of explanation, more types of TTI may be provided.

As described above, the TTI controls various parameters for information transmission. For example, parameters such as a unit of packet transmission, a frequency of updating a data modulation scheme and a channel coding rate in the case of MCS, a unit of error correction coding, a unit of retransmission in the case of ARQ (Automatic Repeat reQuest), and a unit of packet scheduling are determined by the TTI. Because a control channel, which includes control information such as MCS information, retransmission information, and scheduling information, is used for demodulating a data channel, the control channel has to be used along with the data channel during each TTI. A longer TTI can reduce a frequency of inserting (allocating) the control channel, and can improve information transmission efficiency (see FIG. 7).

Figure 8:
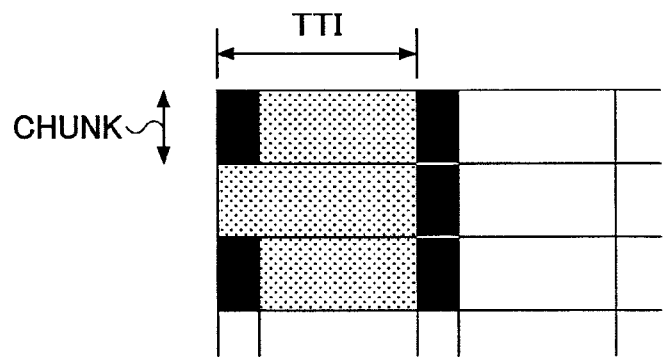
FIG. 8 shows a case where control channels and data channels are used for transmission.

This embodiment is also applicable to the case where a wide frequency band is divided into multiple frequency blocks (or chunks) and a unit of information transmission in the frequency direction is defined by the frequency block. Specifically, when the same user transmits data using multiple frequency blocks, the control channel may not be used for transmission for every chunk, but may be used for transmission only for a single chunk (see FIG. 8).

Figure 7:
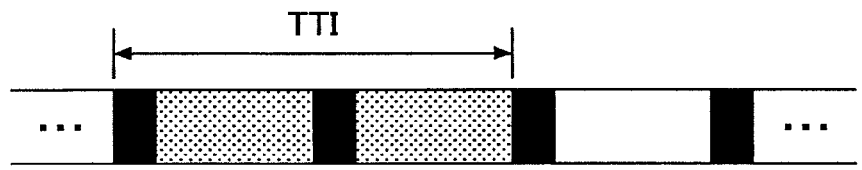
FIG. 7 shows a case where control channels and data channels are used for transmission.

Flexibly changing a unit of information transmission in the time direction and/or the frequency direction can prevent a frequency of inserting (allocating) the control channel from unnecessarily increasing, and can improve information transmission efficiency. Adjusting the length of the TTI is advantageous particularly in the case of a relatively narrow frequency band, because transmission efficiency is directly related to transmission delay when an available frequency band is narrow as shown in FIG. 7.

Second Embodiment

Next, a set of symbol parameters and deriving method thereof in the symbol parameter adjusting units 320 (FIG. 3) and 542 (FIG. 5) are described below. The set of symbol parameters defines the subcarrier interval, the sampling frequency, the period of the effective symbol, the period of the guard interval, the number of symbols in a single TTI, and so on. It should be noted that all of the parameters cannot be determined independently. For example, the subcarrier interval and the period of the effective symbol have a reciprocal relationship with each other. Also, the period of a single TTI is derived by multiplying the period of one symbol (total period of the guard interval and the effective symbol) with the number of symbols. Three methods of deriving a second set of symbol parameters from a first set of symbol parameters are described below.

First, as shown in FIG. 9(A), assume that the first set of symbol parameters is determined as follows.
  subcarrier interval=22.5 kHz
  the total number of subcarriers=200
  sampling frequency=5.76 MHz=3/2*3.84 MHz
  period of effective symbol=256 samples (44.4 μs)
  period of guard interval=32 samples (5.5 μs)
  period of one symbol=288 samples (guard interval+effective symbol)
  loss rate=32/288=11.1%
  the number of symbols in one TTI=10
  period of one TTI=0.5 ms
  period of one frame=10 ms The loss rate means a share of the guard interval in one symbol. The guard interval is a redundant portion from the viewpoint of improved data transmission efficiency. The loss rate η, the period $T_{GI}$ of the guard interval, and the period $T_{eff}$ of the effective symbol have the relationship as follows;

$$\eta = T_{GI}/(T_{GI}+T_{eff})*100[\%].$$

(1) A first method of deriving a set of symbol parameters decreases the number of symbols in a single TTI and increases the period of the guard interval while keeping the subcarrier interval constant. For example, if a first set of symbol parameters now includes 10 symbols in a single TTI, the number of symbols is reduced to 9. Then, the period corresponding to the reduced one symbol (288 samples) is equally divided into 9 portions, each of which is assigned to the guard interval. As a result, as shown in FIG. 9(B), while the period of the effective symbol (256 samples) is kept equal, the single TTI includes 9 symbols with longer periods of the guard interval. A second set of symbol parameters derived in this manner has the parameter values as follows.
  subcarrier interval=22.5 kHz
  the total number of subcarriers=200
  sampling frequency=5.76 MHz=3/2*3.84 MHz period of effective symbol=256 samples (44.4 μs)
period of guard interval=64 samples (11.1 μs)
period of one symbol=320 samples
loss rate=64/320=20%
the number of symbols in one TTI=9
period of one TTI=0.5 ms
period of one frame=10 ms According to the first method, if the number of symbols in one TTI is reduced to 8, the second set of symbol parameters has the parameter values as follow (FIG. 9(C)).

subcarrier interval=22.5 kHz
the total number of subcarriers=200
sampling frequency=5.76 MHz=3/2*3.84 MHz
period of effective symbol=256 samples (44.4 μs)
period of guard interval=104 samples (18.1 μs)
period of one symbol=360 samples
loss rate=104/360=28.9%
the number of symbols in one TTI=8
period of one TTI=0.5 ms
period of one frame=10 ms Subsequently through similar operations, it is possible to derive sets of symbol parameters with different numbers of symbols in a single TTI. In this case, the period of the effective symbol is always kept constant, and thus the subcarrier interval can also be kept constant. In other words, while the same subcarrier interval is defined in accordance with any set of symbol parameters derived in this manner, the period of the guard interval and the number of symbols vary depending on the set of symbol parameters.

(2) A second method of deriving a set of symbol parameters changes the number of symbols in a single TTI while maintaining a constant loss rate. As understood from the definition of the loss rate, the share of the guard interval and the effective symbol has to be kept constant so as to fulfill the constant loss rate. For example, for the first set of symbol parameters, as shown in FIG. 9(D), the periods of the guard interval and the effective symbol are doubled respectively, and accordingly the number of symbols in one TTI can be reduced to 5 symbols. In this case, the second set of symbol parameters has the parameter values as follows.

subcarrier interval=11.25 (=22.5/2) kHz
the total number of subcarriers=400 (=200*2)
sampling frequency=5.76 MHz=3/2*3.84 MHz
period of effective symbol=512 (=256*2) samples (88.8 μs)
period of guard interval=64 (=32*2) samples (11.1 μs)
period of one symbol=576 samples
loss rate=64/576=11.1%
the number of symbols in one TTI=5
period of one TTI=0.5 ms
period of one frame=10 ms In addition, for the first set of symbol parameters, as shown in FIG. 9(E), the periods of the guard interval and the effective symbol are quadrupled respectively, and accordingly the number of symbols in one TTI can be reduced to 2.5 symbols. In this case, the second set of symbol parameters has the parameter values as follows. In this case, it is desirable that the period of a single TTI be extended from 0.5 ms to 1.0 ms, for example, so that an integral number of symbols are included in the single TTI.

subcarrier interval=5.625 (=22.5/4) kHz
the total number of subcarriers=800 (=200*4)
sampling frequency=5.76 MHz=3/2*3.84 MHz
period of effective symbol=1024 (=256*4) samples (177.8 μs)
period of guard interval=128 (=32*4) samples (22.2 μs)
period of one symbol=1152 samples
loss rate=128/1152=11.1%
the number of symbols in one TTI=2.5
period of one TTI=0.5 ms
period of one frame=10 ms According to this method, the constant loss rate can be maintained, and thus it is possible to derive sets of symbol parameters with equal data transmission efficiency. In the first method, as the number of symbols in a single TTI decreases, the loss rate increases accordingly.

(3) A third method of deriving a set of symbol parameters is configured as a combination of the first method and the second method. For example, the first method may be applied to a first set of symbol parameters to derive a second set of symbol parameters, and in turn the second method may be applied to the second set of symbol parameters to derive a third set of symbol parameters. Assume that applying the first method to the first set of symbol parameters has resulted in the second set of symbol parameters for defining a symbol format as shown in FIG. 9(B). Then, the loss rate is equal to 64/320=20% for the second set of symbol parameters. For the second set of symbol parameters, the number of symbols is modified while maintaining the constant loss rate. For example, if the periods of the guard interval and the effective symbol are duplicated respectively, the third set of symbol parameters has the parameter values as follows (FIG. 9(F)).

subcarrier interval=11.25 kHz
the total number of subcarriers=400
sampling frequency=5.76 MHz=3/2*3.84 MHz
period of effective symbol=512 samples (88.8 μs)
period of guard interval=128 samples (22.2 μs)
period of one symbol=640 samples
loss rate=128/640=20%
the number of symbols in one TTI=4.5
period of one TTI=0.5 ms
period of one frame=10 ms Also in this case, it is desirable that the period of a single TTI be extended to 1.0 ms, for example, so that an integral number of symbols are included in the single TTI.

The third set of symbol parameters derived in this manner includes the same loss rate (20%) as the set of symbol parameters shown in FIG. 9(B), and includes the same subcarrier interval (11.25 kHz) as the set of symbol parameters shown in FIG. 9(D). However, it should be noted that the period of the guard interval (128 samples) for the third set of symbol parameters is longer than any ones (64 samples) shown in FIGS. 9(B) and 9(D). According to the third method, it is possible to efficiently derive a set of symbol parameters with a predetermined relationship between the subcarrier interval and the loss rate. In addition, because all of the sets of symbol parameters are prepared for the same sampling frequency, it is not necessary to change clock frequency for each of the sets of parameters.

Figure 10:
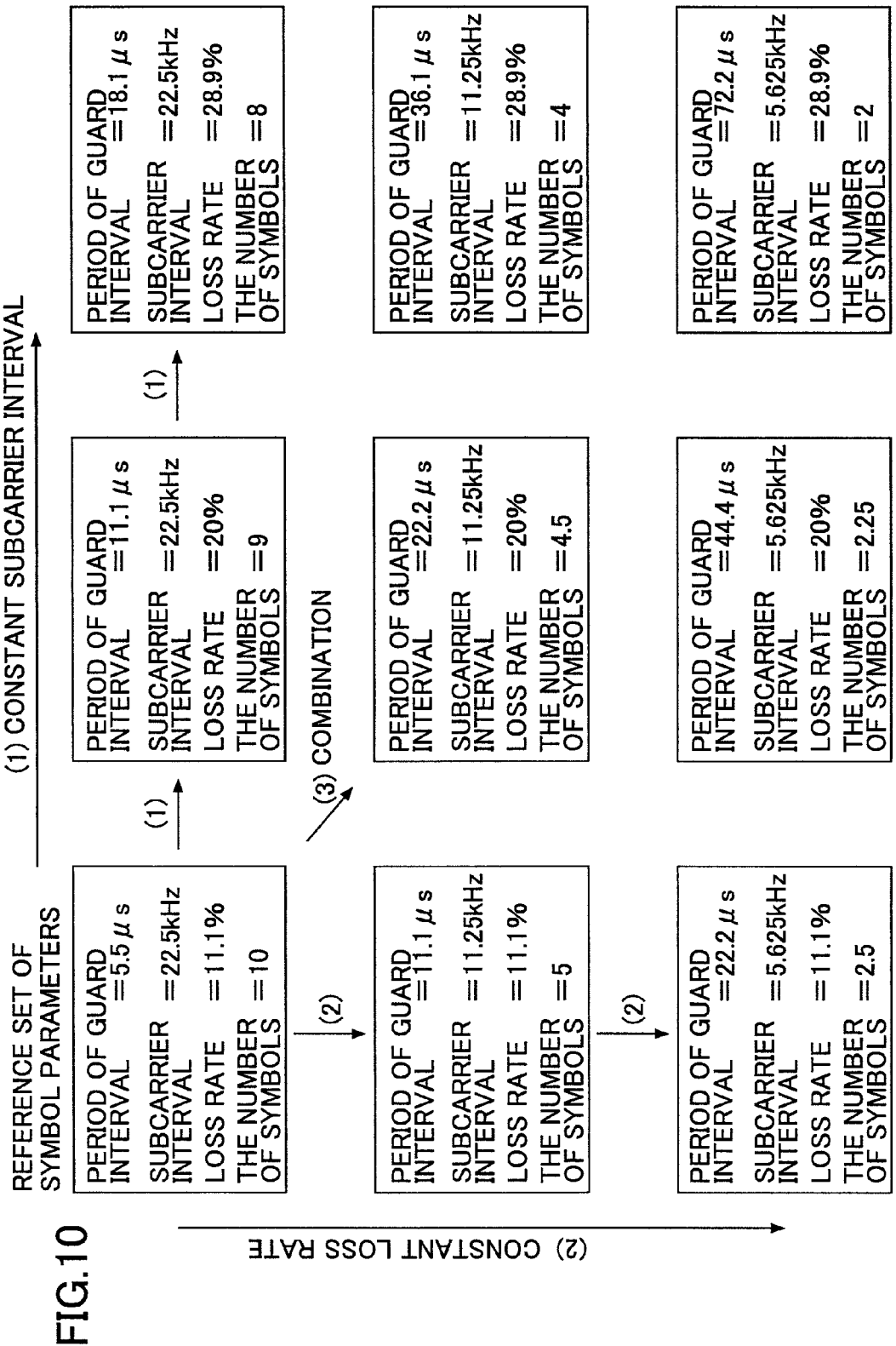
FIG. 10 shows various sets of symbol parameters derived in accordance with one embodiment of the present invention.

FIG. 10 shows several exemplary sets of symbol parameters in case of TTI=0.5 ms. Among 9 sets of symbol parameters, 8 sets of symbol parameters can be derived by applying the first method and/or the second method to the first set of symbol parameters. According to this embodiment, it is possible to systematically and efficiently derive sets of symbol parameters with predetermined relationships between the subcarrier interval and the loss rate. In this embodiment, new sets of symbol parameters have been derived in such a manner that the subcarrier interval and the number of symbols can be reduced from those of the reference set of symbol parameters. In other embodiments, however, such new sets of symbol parameters may be derived in such a manner that the subcarrier interval and the number of symbols can be increased from those of the reference set of symbol parameters.

Third Embodiment

According to the first embodiment, the length of the transmission time interval (TTI) is adjusted. According to the second embodiment, the length of the guard interval and/or the effective symbol is modified. These embodiments may be used independently or used in combination as described below.

Figure 11:
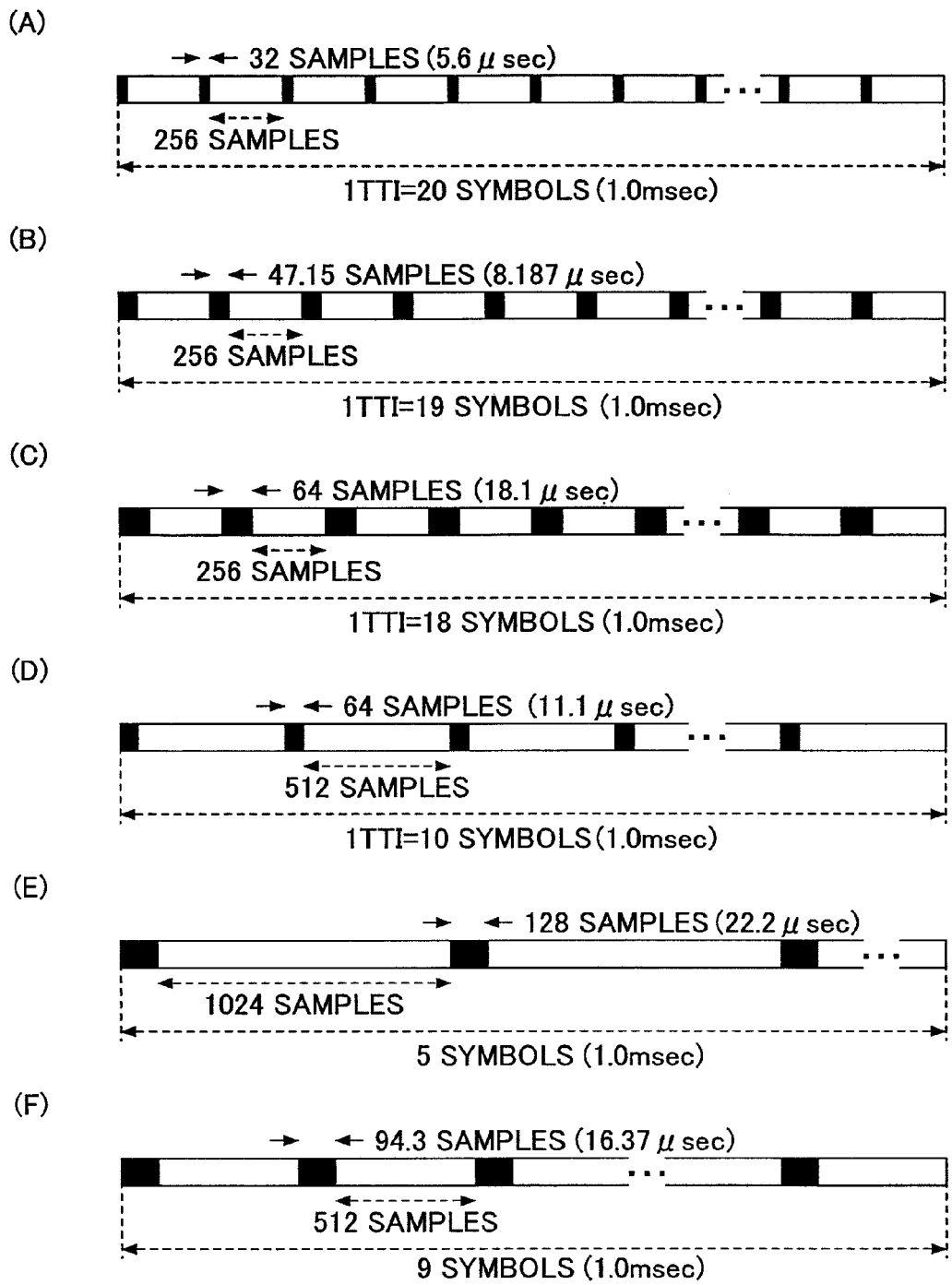
FIG. 11 shows symbol formats respectively defined by sets of symbol parameters derived in accordance with one embodiment of the present invention.

First, as shown in FIG. 11(A), assume that the first set of symbol parameters is determined as follows. These parameter values are the same as those in FIG. 9(A), except that the period of one TTI is extended from 0.5 ms to 1.0 ms.

subcarrier interval=22.5 kHz
    the total number of subcarriers=200
    sampling frequency=5.76 MHz=3/2*3.84 MHz
    period of effective symbol=256 samples (44.4 µs)
    period of guard interval=32 samples (5.5 µs)
    period of one symbol=288 samples (guard interval+effective symbol)
    loss rate=32/288=11.1%
    the number of symbols in one TTI=20
    period of one TTI=1.0 ms
    period of one frame=10 ms (1) A first method of deriving a set of symbol parameters extends the period of the TTI, decreases the number of symbols in the single TTI, and increases the period of the guard interval while keeping the subcarrier interval constant. For example, if a first set of symbol parameters now includes 20 symbols in a single TTI, the number of symbols is reduced to 19. Then, the period corresponding to the reduced one symbol (288 samples) is equally divided into 19 portions, each of which is assigned to the guard interval. As a result, as shown in FIG. 11(B), while the period of the effective symbol (256 samples) is kept equal, the single TTI includes 19 symbols with longer periods of the guard interval. A second set of symbol parameters derived in this manner has the parameter values as follows.

subcarrier interval=22.5 kHz
    the total number of subcarriers=200
    sampling frequency=5.76 MHz=3/2*3.84 MHz
    period of effective symbol=256 samples (44.4 µs)
    period of guard interval=47.16 samples (8.187 µs)
    period of one symbol=303 samples
    loss rate=47/303=15.5%
    the number of symbols in one TTI=19
    period of one TTI=1.0 ms
    period of one frame=10 ms According to the first method, if the number of symbols in one TTI is reduced to 18, the second set of symbol parameters has the parameter values as follow (FIG. 11(C)).

subcarrier interval=22.5 kHz
    the total number of subcarriers=200
    sampling frequency=5.76 MHz=3/2*3.84 MHz
    period of effective symbol=256 samples (44.4 µs)
    period of guard interval=64 samples (11.1 µs)
    period of one symbol=320 samples
    loss rate=64/320=20.0%
    the number of symbols in one TTI=18
    period of one TTI=1.0 ms
    period of one frame=10 ms Subsequently through similar operations, it is possible to derive sets of symbol parameters with different numbers of symbols in a single TTI. In this case, the period of the effective symbol is always kept constant, and thus the subcarrier interval can also be kept constant. In other words, while the same subcarrier interval is defined in accordance with any set of symbol parameters derived in this manner, the period of the guard interval and the number of symbols vary depending on the set of symbol parameters. In the examples shown in FIGS. 9(B), 9(C), 11(B), and 11(C), the number of symbols in one TTI is reduced by one symbol or two symbols, and the period corresponding to the reduced symbol(s) is equally divided into the guard intervals in the remaining symbols. In the examples shown in FIG. 11, the transmission time interval is extended twice as the transmission time interval in the examples shown FIG. 9. As a result, while the loss rate is equal to 20% in the example shown in FIG. 9(B), the loss rate is reduced to 15.5% in the example shown in FIG. 11(C). Similarly, while the loss rate is equal to 28.9% in the example shown in FIG. 9(C), the loss rate is reduced to 20.0% in the example shown in FIG. 11(C). Extending the length of the TTI in this manner can improve the loss rate, when the first method of the second embodiment is used.

(2) A second method of deriving a set of symbol parameters extends the period of the TTI, and changes the number of symbols in the single TTI while maintaining a constant loss rate. As understood from the definition of the loss rate, the share of the guard interval and the effective symbol has to be kept constant so as to fulfill the constant loss rate. For example, for the first set of symbol parameters, as shown in FIG. 11(D), the periods of the guard interval and the effective symbol are doubled respectively, and accordingly the number of symbols in one TTI can be reduced to 10 symbols. In this case, the second set of symbol parameters has the parameter values as follows.

subcarrier interval=11.25 (=22.5/2) kHz
    the total number of subcarriers=400 (=200*2)
    sampling frequency=5.76 MHz=3/2*3.84 MHz
    period of effective symbol=512 (=256*2) samples (88.8 µs)
    period of guard interval=64 (=32*2) samples (11.1 µs)
    period of one symbol=576 samples
    loss rate=64/576=11.1%
    the number of symbols in one TTI=10
    period of one TTI=1.0 ms
    period of one frame=10 ms In addition, for the first set of symbol parameters, as shown in FIG. 11(E), the periods of the guard interval and the effective symbol are quadrupled respectively, and accordingly the number of symbols in one TTI can be reduced to 5 symbols In this case, the second set of symbol parameters has the parameter values as follows.

subcarrier interval=5.625 (=22.5/4) kHz
    the total number of subcarriers=800 (=200*4)
    sampling frequency=5.76 MHz=3/2*3.84 MHz
    period of effective symbol=1024 (=256*4) samples (177.8 µs)
    period of guard interval=128 (=32*4) samples (22.2 µs)
    period of one symbol=1152 samples
    loss rate=128/1152=11.1%
    the number of symbols in one TTI=5
    period of one TTI=1.0 ms
    period of one frame=10 ms According to this method, the constant loss rate can be maintained, and thus it is possible to derive sets of symbol parameters with equal data transmission efficiency. In the first method, as the number of symbols in a single TTI decreases, the loss rate increases accordingly. Although the number of symbols in one TTI is equal to 2.5 symbols in the example shown in FIG. 9(E), the number of symbols is equal to 5 symbols in FIG. 11(E). In this manner, when a non-integral number of symbols are included in a single TTI with use of the method of the second embodiment, extending the length of the TTI allows the number of symbols in the single TTI to be adjusted to be an integer.

(3) A third method of deriving a set of symbol parameters is configured as a combination of the first method and the second method while extending the period of the TTI. For example, the first method may be applied to a first set of symbol parameters to derive a second set of symbol parameters, and in turn the second method may be applied to the second set of symbol parameters to derive a third set of symbol parameters. Assume that applying the first method to the first set of symbol parameters has resulted in the second set of symbol parameters for defining a symbol format as shown in FIG. 11(B). Then, the loss rate is equal to 15.5% for the second set of symbol parameters. For the second set of symbol parameters, the number of symbols is modified while maintaining the constant loss rate. For example, if the periods of the guard interval and the effective symbol are duplicated respectively, the third set of symbol parameters has the parameter values as follows (FIG. 11(F)).

subcarrier interval=11.25 kHz
the total number of subcarriers=400
sampling frequency=5.76 MHz=3/2*3.84 MHz
period of effective symbol=512 samples (88.8 μs)
period of guard interval=94.3 samples (16.37 μs)
period of one symbol=606.3 samples
loss rate=94.3/606.3=15.5%
the number of symbols in one TTI=9
period of one TTI=1.0 ms
period of one frame=10 ms The third set of symbol parameters derived in this manner includes the same loss rate (15.5%) as the set of symbol parameters shown in FIG. 11(B), and includes the same subcarrier interval (11.25 kHz) as the set of symbol parameters shown in FIG. 11(D). However, it should be noted that the period of the guard interval (94.3 samples) for the third set of symbol parameters is longer than any ones shown in FIGS. 11(B) and 11(D). According to the third method, it is possible to efficiently derive a set of symbol parameters with a predetermined relationship between the subcarrier interval and the loss rate. In addition, because all of the sets of symbol parameters are prepared for the same sampling frequency, it is not necessary to change clock frequency for each of the sets of parameters. Moreover, the number of symbols included in the single TTI can be adjusted to be an integer.

Although the preferred embodiments of the present invention have been described above, the present invention is not limited to them, and various modifications and variations can be made within the scope and sprit of the present invention. For ease of explanation, the present invention has been described with the use of some discrete embodiments. However, such separation of the embodiments is not essential to the present invention, and one or more embodiments may be used if needed.

This international patent application is based on Japanese Priority Application No. 2005-174396 filed on Jun. 14, 2005, the entire contents of which are hereby incorporated by reference.

What is claimed is:

1. An apparatus for generating a set of radio parameters used for an OFDM (Orthogonal Frequency Division Multiplexing) mobile communication system which transmits or receives multiple symbols for each fixed-length transmission time interval, the multiple symbols including guard intervals and effective symbols, comprising:

a symbol parameter adjusting unit configured to derive a set of second symbol parameters, so that a period of an effective symbol defined by a set of first symbol parameters is equal to a period of an effective symbol defined by the set of second symbol parameters, and a period of a guard interval defined by the set of first symbol parameters is different from a period of a guard interval defined by the set of second symbol parameters;

the symbol parameter adjusting unit configured to derive a set of third symbol parameters, so that a share of a guard interval in a symbol defined by the set of first symbol parameters is equal to a share of a guard interval in a symbol defined by the set of third symbol parameters, and a length of the symbol defined by the set of first symbol parameters is different from a length of the symbol defined by the set of third symbol parameters; and a transmitting unit configured to transmit to a mobile station a signal with symbols whose parameters are adjusted by the symbol parameter adjusting unit, wherein the number of symbols is adjusted so that the number of symbols in a fixed-length transmission time interval is different depending on the set of first symbol parameters, the set of second symbol parameters, or the set of third symbol parameters.

2. An OFDM (Orthogonal Frequency Division Multiplexing) receiver which receives multiple symbols for each fixed-length transmission time interval, the multiple symbols including guard intervals and effective symbols, comprising:

a receiving unit configured to receive a signal from a base station;

a symbol parameter adjusting unit
configured to derive a set of second symbol parameters, so that a period of an effective symbol defined by a set of first symbol parameters is equal to a period of an effective symbol defined by the set of first symbol parameters is equal to a period of an effective symbol defined by the set of second symbol parameters, and a period of a guard interval defined by the set of first symbol parameters is different from a period of a guard interval defined by the set of second symbol parameters;

the symbol parameter adjusting unit configured to derive a set of third symbol parameters, so that a share of a guard interval in a symbol defined by the set of first symbol parameters is equal to a share of a guard interval in a symbol defined by the set of third symbol parameters, and a length of the symbol defined by the set of first symbol parameters is different from a length of the symbol defined by the set of third symbol parameters;

a guard interval removal unit configured to remove a portion corresponding to the guard interval from the received signal based on a result of deriving by the symbol parameter adjusting unit; and a Fast Fourier Transform unit configured to perform Fast Fourier Transform for a signal from the guard interval removal unit, wherein the number of symbols is adjusted in the symbol parameter adjusting unit so that the number of symbols in a fixed-length transmission time interval is different depending on the set of first symbol parameters, the set of second symbol parameters, or the set of third symbol parameters.

* * * * *